March 8, 1955 F. H. LEE 2,703,634
PORTABLE DERRICK
Filed April 30, 1949 10 Sheets-Sheet 1

INVENTOR.
Francis H. Lee
BY
Attorney

March 8, 1955 F. H. LEE 2,703,634
PORTABLE DERRICK
Filed April 30, 1949 10 Sheets-Sheet 8

INVENTOR.
Francis H. Lee
BY
Attorney

United States Patent Office 2,703,634
Patented Mar. 8, 1955

2,703,634

PORTABLE DERRICK

Francis H. Lee, Bakersfield, Calif., assignor to Hopper Machine Works, Inc., Bakersfield, Calif., a corporation of California Application April 30, 1949, Serial No. 90,760

6 Claims. (Cl. 189—11)

This invention has to do with a portable rig, it being a general object of the invention to provide a rig characterized by a collapsible derrick and useful, generally, for the drilling or servicing of wells, for instance, oil wells or the like.

There are many instances in connection with the drilling, repair, or servicing of wells when a derrick of substantial height is required to handle various tools and miscellaneous equipment or well parts. In many such situations permanent derrick constructions are impractical or unnecessary while portable or transportable derricks are sufficient. Various constructions have been proposed and certain structures have been used as portable derricks or rigs. However, in general such structures are cumbersome to transport or move over highways or roads, are difficult either to erect or take down, or are distinctly limited in their usefulness when in operation.

It is a general object of this invention to provide a rig characterized by a collapsible derrick which, when folded or collapsed can be easily transported and which when erected, or in operation, is of substantial height, is strong, rigid, and dependable.

Another object of my invention is to provide a rig of the general character referred to including a collapsible derrick wherein there is a lower or stationary section to which a main section is pivotally connected and which includes a prop that effectively acts between the said derrick sections to dependably hold the main section in the up or working position.

It is a further object of this invention to provide a rig of the general character referred to including a derrick in which a top section is pivoted to a main pivotally mounted section and an operating means is provided to pivot or swing the top section relative to the main section after the main section has been moved to an up position, all in such manner as to move or operate the top section in a very economical and dependable manner.

It is another object of this invention to provide a rig of the general character referred to including a derrick in which there is a rack carried by a main section, which rack is normally operated by gravity to a working position and is under control of a connection with the top section of the derrick so that the rack is folded to the derrick sections when the derrick is moved to the folded or collapsed position.

A further object of this invention is to provide a rig of the general character referred to wherein there are several fluid pressure actuated mechanisms or units coupled in a hydraulic system rendering the rig simple, convenient, and practical to operate.

The various objects and features of my invention will be fully understood from the following detailed description of a typical preferred form and application of my invention, throughout which description reference is made to the accompanying drawings, in which:

Figure 21:
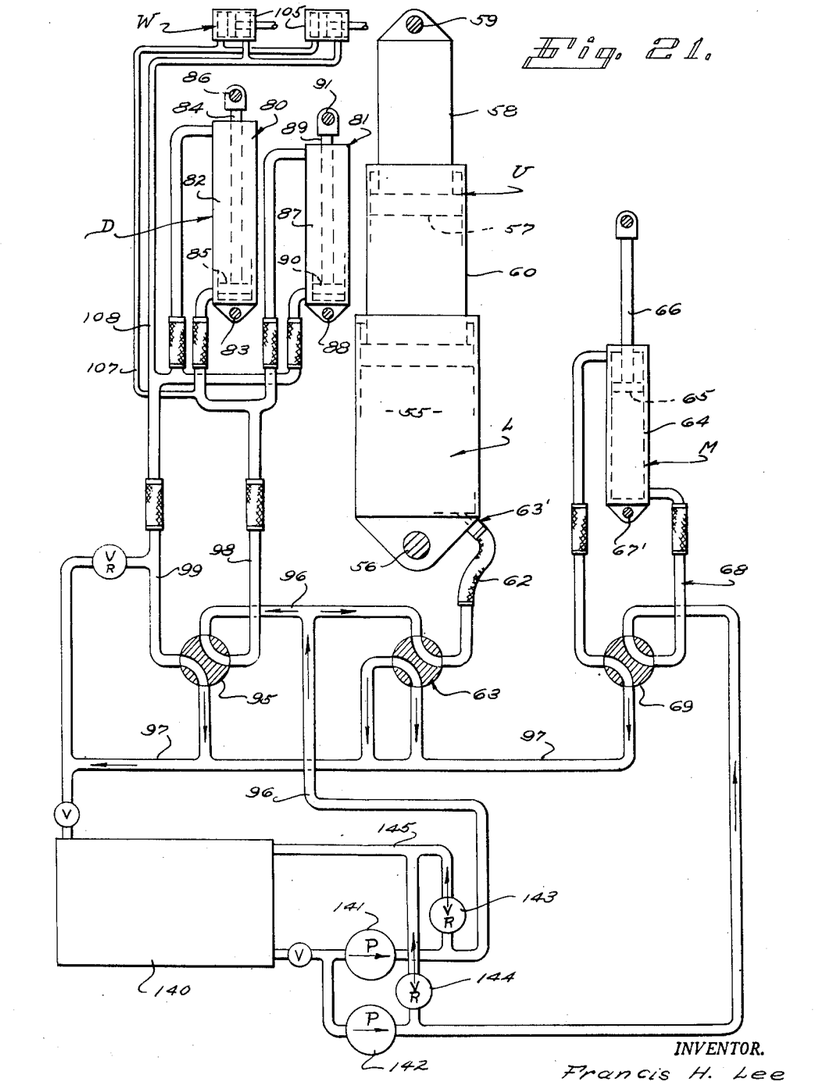
Fig. 21 is a diagrammatic view illustrating the hydraulic system provided by the present invention.

The structure provided by the present invention involves, generally, a wheeled carrier or vehicle A which is preferably a sectional structure including a stationary section G, a main or middle section H and a top section J, connecting means K between the stationary and main sections of the derrick including a pivotal connection between the derrick sections and a prop 10 acting between the stationary and main sections, operating means L to move the main section H to move it relative to the base section G, operating means M for the prop 10, lock means N for securing the main section in operating position relative to the stationary section, connecting means P between the main section H and the top section J of the derrick, such means including pivots connecting the derrick sections, operating means D for shifting the top section relative to the main section, and lock means W securing the top section in operating position relative to the main section, a platform Q carried by the main section H and serving as a rack and a support for an operator in the derrick, a crown block R fixed on the upper end of the top section J handling a line 13 which operates equipment such, for example, as a traveling block 14 and elements such as a tool 15 engaged with a well part 16, or the like, a platform S at the upper or head end of the derrick, means T releasably holding the top section in folded position relative to the main section H of the derrick, and a hydraulic system U illustrated diagrammatically in Fig. 21 of the drawings.

Figures 1, 2, 3:
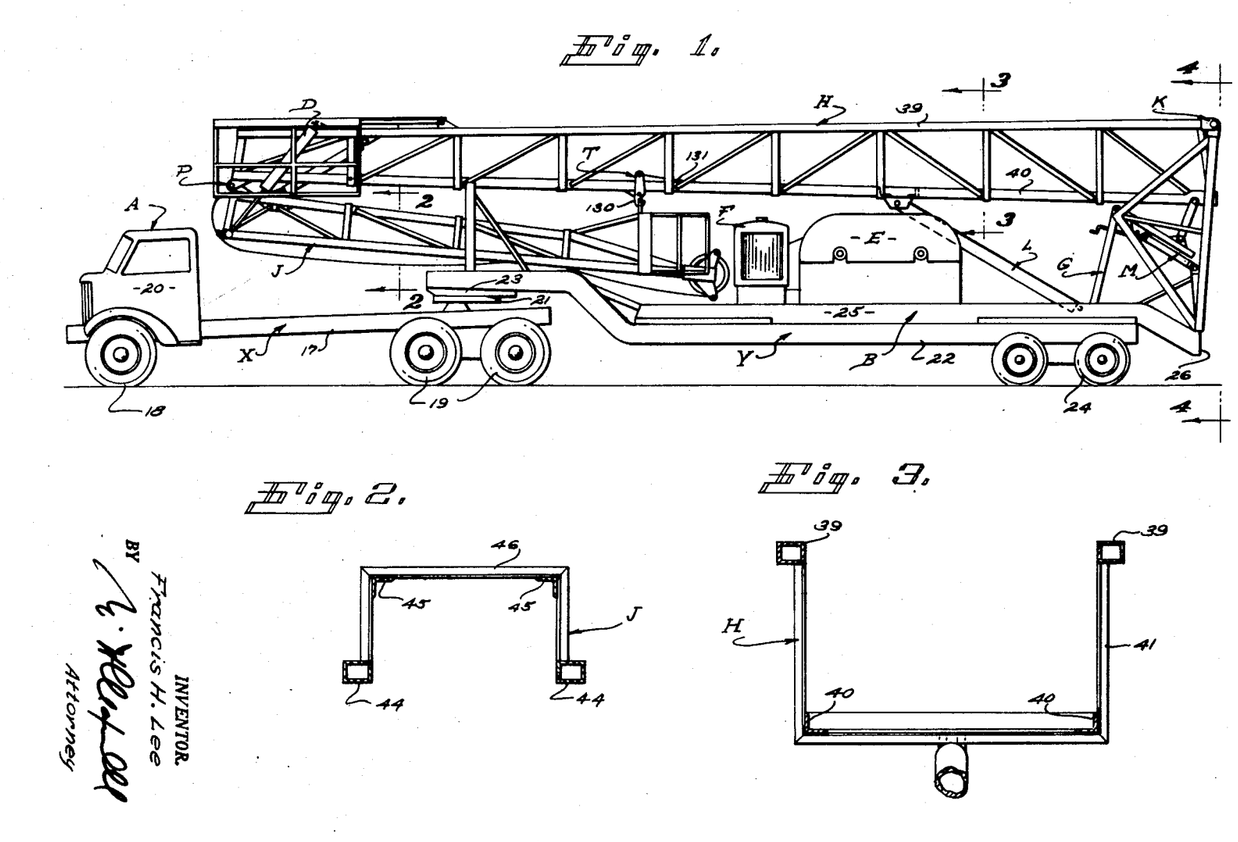
Fig. 1 is a side elevation of the rig provided by the present invention showing the derrick collapsed or folded ready for transportation or movement from one location to another.
Fig. 2 is an enlarged detailed transverse sectional view of the upper section of the derrick, being a view taken as indicated by line 2—2 on Fig. 1.
Fig. 3 is an enlarged detailed transverse sectional view of the main section of the derrick, being a view taken as indicated by line 3—3 on Fig. 1.
Figure 4:
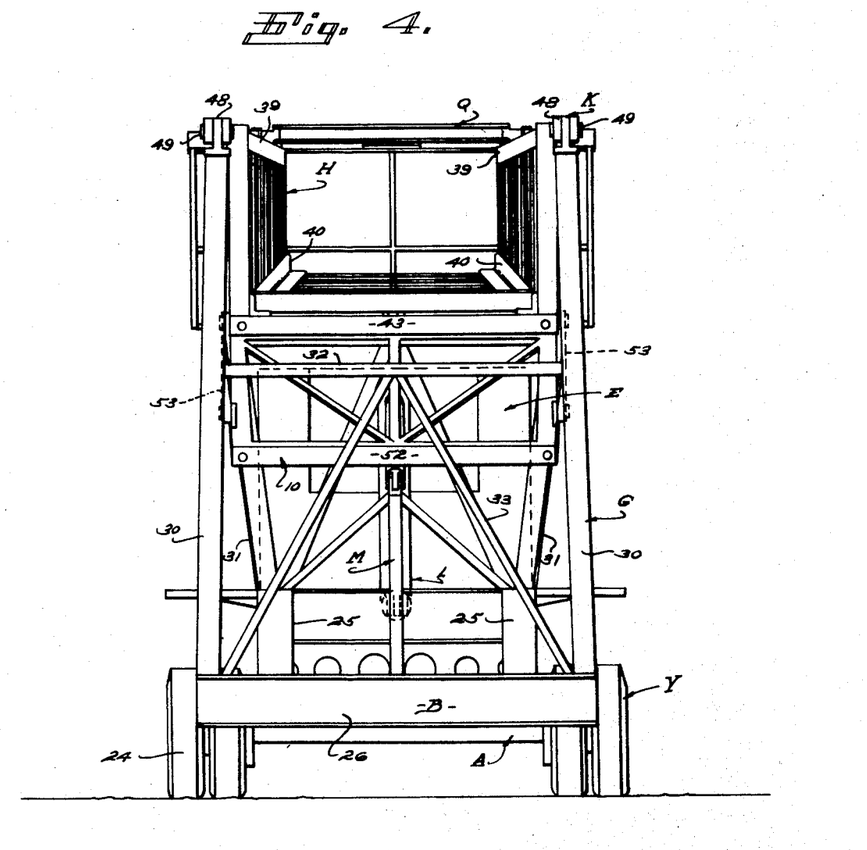
Fig. 4 is an enlarged detailed view showing the structure illustrated in Fig. 1 viewed from the rear thereof, as indicated by line 4—4 on Fig. 1.

The wheeled carrier or vehicle A is provided primarily to transport the remainder of the structure, preferably while the derrick is in the collapsed position shown in Fig. 1. In accordance with the broader aspects of the invention the carrier or vehicle A may vary widely in form and construction. However, since the derrick, when folded and horizontally disposed, is a structure of substantial length, it is desirable to provide a vehicle A which is sectional and in such case it is practical to employ a draft section X and a rig section Y.

The draft section X of vehicle A is shown as involving a chassis 17 supported on front wheels 18 and rear wheels 19. The chassis is shown as carrying a cab 20 and as supporting the base section 21 of a pivotal connection which joins the vehicle sections X and Y.

The rig section of the vehicle is illustrated as a trailer-like structure of the low bed type having a chassis 22 raised at its forward end where it carries the upper section 23 of the pivotal connection. The rear end portion of the chassis 22 is carried by supporting wheels 24.

The base B carried by the rig section Y of the draft vehicle is an elongate horizontally disposed frame-like structure fixed on the chassis of the vehicle section Y to extend longitudinally thereof so that it is, in effect, a rigid or fixed part of vehicle section Y. The base is shown as including longitudinal side beams 25 and an end beam 26 joining the rear ends of the side beams. The rear end portion of the base projects rearward beyond the chassis 22 and this portion of the frame is preferably depressed so that it extends downward and rearward from the chassis 22 locating the end beam of the base as close as practical to the ground on which the vehicle is supported.

One or more stabilizers C is engaged with the base B to serve as a support acting directly between the base B and the ground, so that the derrick is supported from the ground independently of the pneumatically tired wheels of the vehicle. In practice jacks or jacklike devices are employed as stabilizers to act between the rear end portion of the base and the ground.

The draw works E may, in practice, be any suitable line handling mechanism and it is preferably carried by the base B forward of the portion of the base which carries the derrick. In the case illustrated the draw works is shown mounted on the base about midway between the ends of the rig section of the vehicle.

The prime mover F serves as a source of power for driving the mechanism and, in practice, it may be an internal combustion engine or the like, in which case it may be advantageously mounted on the base B adjacent or immediately forward of the draw works, as shown in the drawings. In the particular case illustrated the prime mover not only drives the draw works but operates the pressure generating means of the hydraulic systems such as the pumps thereof illustrated in the diagram, Fig. 21.

The derrick is mounted on or carried by the base B, preferably in the rear end portion thereof, and in accordance with the present invention it is a sectional construction involving a plurality of pivotally connected sections, namely the sections G, H and J.

The stationary section G of the derrick is a stationary or fixed structure on the rear end portion of the base, and it is preferably of limited vertical extent, being in the nature of a stand projecting upward at the rear end portion of the base and presenting structural parts or features accommodating the other elements, as hereinafter described.

In the preferred form of the invention the stationary section involves two main or load bearing leg sections 30 that occur at the rearmost side of the derrick, two stabilizing or secondary leg sections 31 that occur forward of the main leg sections and braces stabilizing the leg sections.

The main or load bearing leg sections 30 are preferably rigid, for instance, tubular members having their lower ends fixed to the rear corners of the base. In the construction illustrated the rear beam 26 of the base has end or corner portions projecting laterally from the side beams 25 forming the corner parts which support the leg sections 30. In practice it is desirable that the derrick be substantially straight from one end to the other and that it lean or pitch somewhat rearwardly as it extends up from the rear end of the base B. In the case illustrated the main leg sections 30 extend up and somewhat rearwardly from the points where they are joined to the base and they also converge slightly, since it is preferred that the derrick be somewhat narrower at its upper end than at its lower end.

Figure 7:
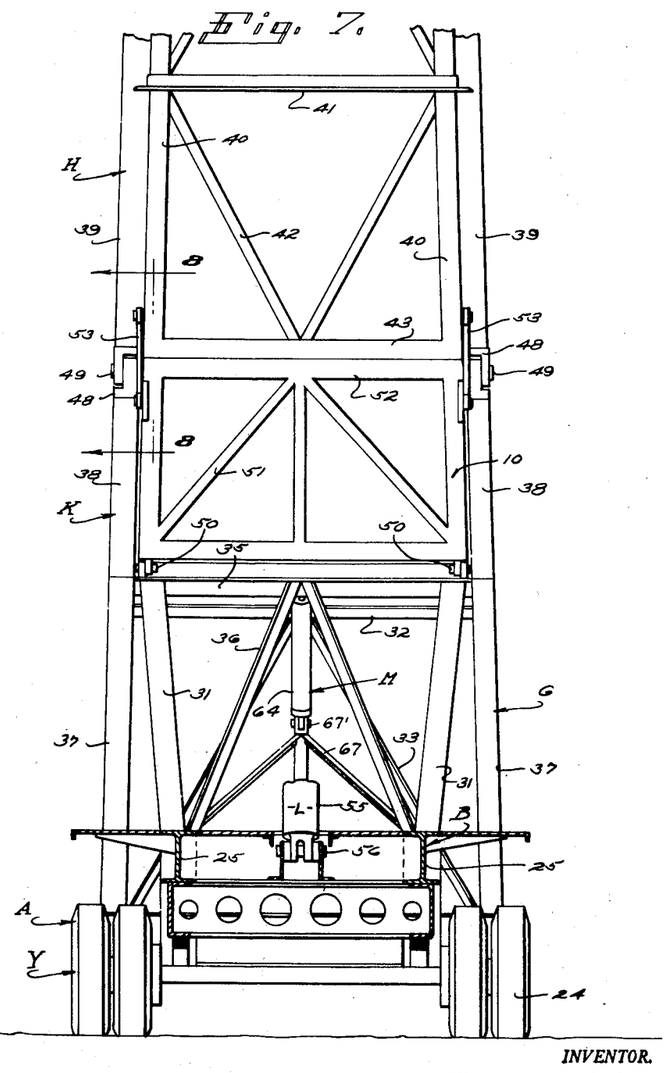
Fig. 7 is an enlarged detailed sectional view of structure shown in Fig. 6, being a view taken as indicated by line 7—7 on Fig. 6.

The secondary or stabilizing leg sections occur forward of the main leg sections and have their lower ends fixed to the side beams 25. The leg sections 31 extend upwardly and rearwardly from the points where they connect to the beams and they diverge as they extend upwardly, as clearly shown in Fig. 7 of the drawings.

The stabilizing legs 31 are considerably shorter than the main leg sections 30 so that they terminate well below the upper ends of the main leg sections 30.

In practice any suitable system or arrangement of ties and braces may be combined with the legs 30 and 31 so that the derrick section G is a strong rigid construction. In the form of the invention illustrated in the drawings the bracing involves a transverse tie or beam 32 that extends horizontally between the leg sections 30 at a point well below their upper ends and at an elevation substantially the same as the upper ends of the stabilizing leg sections 31. Diagonal braces 33 connect to the middle portion of beam 32 and diverge therefrom to the points where the leg sections 30 are connected to the base.

A beam 35 extends horizontally between the upper ends of the stabilizing leg sections 31 and diagonal braces 36 connect to the middle portion of beam 35 and diverge therefrom to the points where the leg sections 31 connect to the base. At the sides of the structure lower diagonal braces 37 extend from the upper ends of the leg sections 31 to the lower ends of the leg sections 30 while upper diagonal braces 38 extend from the upper ends of the leg sections 31 to the upper ends of the leg sections 30.

The main derrick section H is an elongate structure which is rigid and which is preferably substantially U-shaped in cross sectional configuration. The section H is incorporated in the structure so that it opens or faces rearwardly when up or in operating position providing an open structure accommodating tools or equipment handled by the rig.

The main section H is characterized by two main or load bearing leg sections 39 that extend up and slightly rearward when the derrick is in operating position, while they extend slightly inward or converge so that they are co-axial with the main leg sections 30 of the derrick section G. Derrick section H further includes stabilizing leg sections 40 spaced apart transversely of the structure and located forward of the main leg sections so that they extend upward and somewhat rearward while they converge somewhat to be closer together at the upper end of the derrick section than at the lower end.

The lower ends of the main leg sections 39 occur adjacent the upper ends of the main leg sections 30 of derrick section G while the lower ends of the stabilizing leg sections 40 occur at about the same level or in about the same horizontal plane as the lower ends of the main leg sections 39. The construction just described leaves a substantial opening or space between the upper ends of the stabilizing leg sections 31 of the derrick section G and the lower ends of the stabilizing leg sections 40 of the derrick section H. The upper ends of the several leg sections of derrick section H preferably terminate in a common horizontal plane when the derrick is in operating position.

In practice suitable bracing is provided between the several leg sections of the derrick section H. In the case illustrated horizontal spacers 41 and diagonal struts 42 occur between the stabilizing legs 40 and also between the stabilizing legs 40 and the main leg sections 39. The lowermost horizontal spacer 43 between the stabilizing leg sections 40 occurs at the lower ends of the leg sections 40.

The top section J of the derrick is an elongate structure which, when in operating position, forms an upward continuation of the main section H. The derrick section J is shown as including two main or load bearing leg sections 44 which continue from the upper ends of the main leg sections 39 and extend somewhat rearwardly and also converge slightly to be coaxial with the leg sections 39. The main load bearing leg sections 44 terminate at the crown block R.

The top section J further includes two stabilizing leg sections 45 which are spaced forward from the leg sections 44 and which are pitched or inclined like the stabilizing leg sections of derrick section H so that they are coaxial therewith, as shown throughout the drawings. Derrick section J is provided with suitable bracing and in the case illustrated this bracing includes horizontal spreaders 46 and diagonal struts 47, all of which occur between the stabilizing legs 45 and between the stabilizing legs 45 and the main leg sections 44.

The connecting means K occurs between the stationary derrick section and the main derrick section and it involves, in general, pivots between the derrick sections and the prop that acts between the derrick sections when the derrick is in operating position. The pivots of the connecting means occur between the upper ends of the leg sections 39 and the lower ends of the leg sections 39 and in the case illustrated each pivot involves brackets 48 on the ends of the leg sections and pivot pins 49 that pivotally connect the brackets. The parts are so constructed and related that the pivot pins 49 are on a common horizontal transverse axis located at the rear side of the derrick structure.

The prop 10 is a rigid substantially rectangular frame pivotally connected to the upper ends of the stabilizing legs 31 of the derrick section G to be movable between a folded or collapsed position such as is shown in Fig. 1, and an up or active position where it engages under the upright main derrick section H to occur beneath the stabilizing leg sections thereof. In the preferred form of the invention the prop is connected to the upper ends of the stabilizing leg sections 31 by pivot pins 50 and the prop is stiffened or made rigid by suitable bracing 51. The upper transverse element 52 of the prop extends horizontally and transversely of the structure and is such as to engage under and form a bearing which supports the main derrick section through the lower ends of the leg sections 40 and the lowermost spacer 43.

Figures 5, 6:
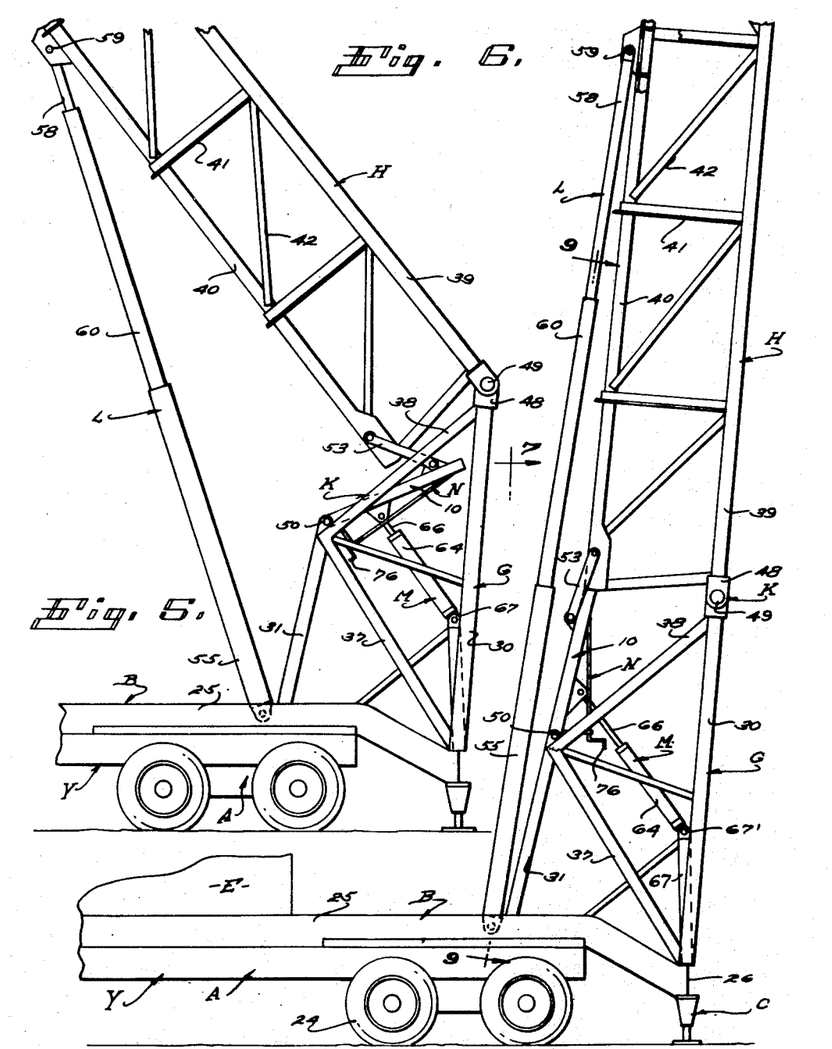
Fig. 5 is an enlarged detailed view of the rear end portion of the structure shown in Fig. 1, showing the main section of the derrick pivoted to the stationary section thereof, with the main section in a partially operated or elevated position.
Fig. 6 is a view similar to Fig. 5, showing the main section of the derrick in a fully operated or erected position with the prop provided by the invention in position to maintain the main section in the erected position.

In the preferred form of the invention suitable linkage connects the prop 10 and the main derrick section H so that the prop operates or swings between the positions above described, in the course of operation of the main derrick section between the positions shown in Fig. 1 and Fig. 6. The particular linkage illustrated in the drawings involves links 53 located at the exterior of the derrick, one at each side thereof. Each link has its lower end pivotally connected to the upper end portion of the stabilizer and has its upper end pivotally connected to the lower end portion of the derrick section H at the rear thereof, as for instance, to the stabilizer leg sections 40. In the preferred arrangement the links 53 are so pivoted to the prop and the main derrick section as to go over or swing past the center or point at which the stabilizing legs 40 rest on the stabilizing legs 31 as shown in Fig. 6 of the drawings.

The operating means L for the main section H of the derrick is a collapsible or extensible structure, preferably a fluid pressure actuated device or actuator. In the preferred form of the invention shown in the drawings the operating means L involves, generally, a main hydraulic cylinder 55 pivotally connected to the base B by a horizontally disposed pivot pin 56, a piston 57, a rod 58 extending from piston 57 and pivotally connected to the rear of derrick section H at a point well above the lower end thereof by a pivot pin 59, and an intermediate element or sleeve 60 which extends into and operates in cylinder 55 and which receives or carries the piston 57. The sleeve 60 carries packing 61 which forms a head sealing or slidably fitting in the cylinder 55.

Operating fluid is introduced into the lower end of cylinder 55 through a supply line 62 and is under control of a valve 63. The fluid enters the cylinder 55 through a regulating valve 63' which serves to freely admit operating fluid to cylinder 55 but checks its discharge therefrom. The valve 63' is shown as including a ball check 65 passing fluid freely into cylinder 55 and a small bleed opening or bypass opening 66 which allows fluid to escape from the cylinder past the valve 65 but at a limited rate.

The mechanism just described so connects the base B and the main section H of the derrick that fluid under pressure admitted to cylinder L swings or forces the derrick section H from a folded or collapsed position such as is shown in Fig. 1 to an up or working position such as is shown in Fig. 6, and the mechanism is of such capacity as to move the main section H in the manner just described while the top section J of the derrick is latched thereto by means such as the means T. With the parts arranged and proportioned as shown throughout the drawings the pivot pin which connects the cylinder 55 with the base B is located within the base B immediately forward of the point where the stationary section of the derrick is connected to the base.

Figure 23:
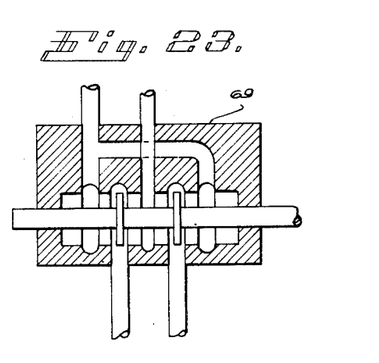

The operating means M for the prop 10 is preferably a fluid pressure actuated device and in the form of the invention illustrated it involves a cylinder 64 pivotally attached to the base B, a piston 65 operating in cylinder 64, and a rod 66 from piston 65 and pivotally attached to the gate. In the arrangement of parts illustrated the cylinder 64 is connected to a standard 67 on base B by a pivot pin 67'. Operating fluid is supplied to cylinder 66 through lines 68 under control of a valve 69, the parts being such that fluid under pressure admitted into one end of cylinder 64 forces the prop from the position shown in Fig. 1 to that shown in Fig. 6, whereas when pressure is admitted into the other end of cylinder 64 it retracts the prop from the position shown in Fig. 6 to that shown in Fig. 1. Valve 69 is preferably an open center valve, as illustrated in Fig. 23 of the drawings, so that the possibility of structural damage is minimized that otherwise might be caused by improper operation.

Figures 8, 9, 10:
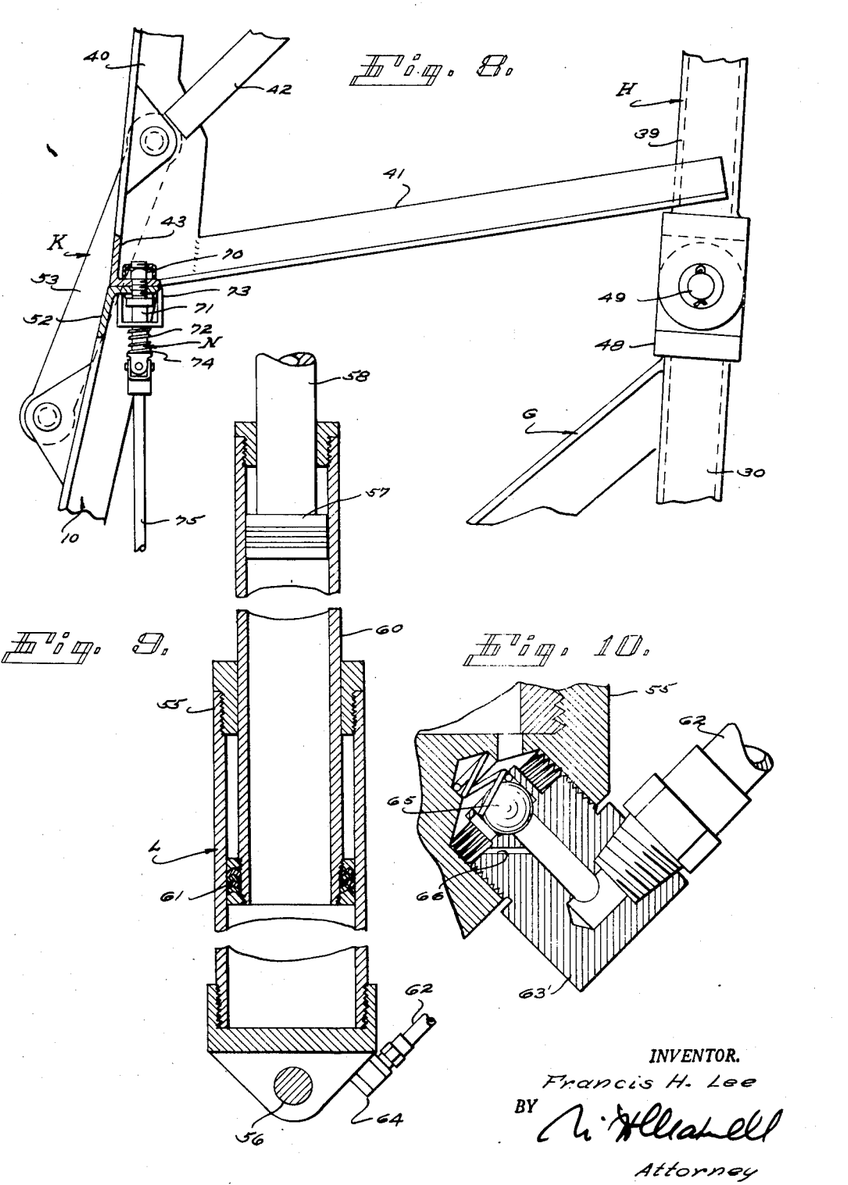
Fig. 8 is an enlarged detailed sectional view of structure shown in Fig. 7, being a view taken as indicated by line 8—8 on Fig. 7.
Fig. 9 is an enlarged detailed sectional view of structure shown in Fig. 6, being a view taken as indicated by line 9—9 on Fig. 6.
Fig. 10 is an enlarged detailed sectional view of structure shown at the bottom of Fig. 9.

The lock means N is provided to releasably secure the main derrick section H in operating position, as shown in Fig. 6. In the form of the invention illustrated the lock means involves screw fasteners at the points where the stabilizing leg sections 40 occur over the prop 10 when the prop is in operating position, as shown in Fig. 8. In the particular case illustrated a threaded member or nut 70 is fixed in the lower end of each stabilizing leg 40 and threaded pins 71 are slidably supported by the prop and are engageable with the nuts when the derrick section H and the prop 10 are in operating position. Springs 72 normally hold the pins in retracted positions and in so doing they act between guides 73 which carry the pins and shoulders 74 on the pins. Operators for the pins 73 include rods 75 extending downward to be conveniently accessible, the rods being provided with suitable cranks or handles 76, as shown in the drawings.

The connecting means P acting between or coupling the top section J and the main section H of the derrick involves pivotal connections that occur at the foremost side of the derrick, in fact, the means P connects the said derrick sections on an axis somewhat forward of the derrick sections. In the construction illustrated brackets 77 are provided on the ends of the leg sections 40 and 45 and pivot pins 78 connect the brackets, as shown throughout the drawings. By locating the pivot pins 78 on an axis transverse of the derrick and somewhat forward of the derrick sections H and J, the means P connects the said derrick sections so that the top section can swing between a folded position substantially parallel with and below the derrick section H, as shown in Fig. 1, and an upright or working position parallel with derrick section H, as shown in Fig. 13.

Figures 11, 12, 14:
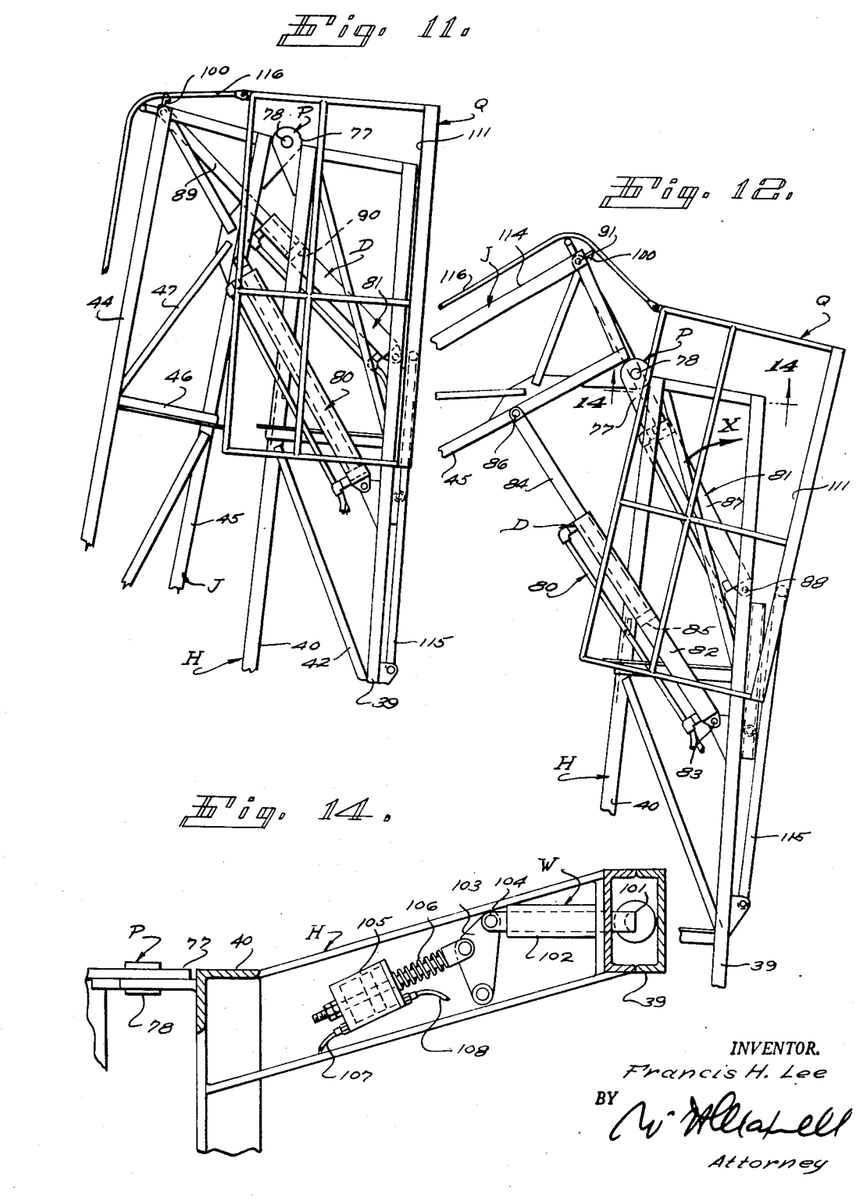
Fig. 11 is an enlarged side elevation of the foremost portion of the rig as illustrated in Fig. 1, showing it in an elevated or upright position in which it occurs after the main section of the derrick has been moved to the upright position.
Fig. 12 is a view of the parts shown in Fig. 11, showing the top section partially operated or elevated relative to the main section.
Fig. 14 is an enlarged detailed sectional view taken as indicated by line 14—14 on Fig. 12.
Figure 13:
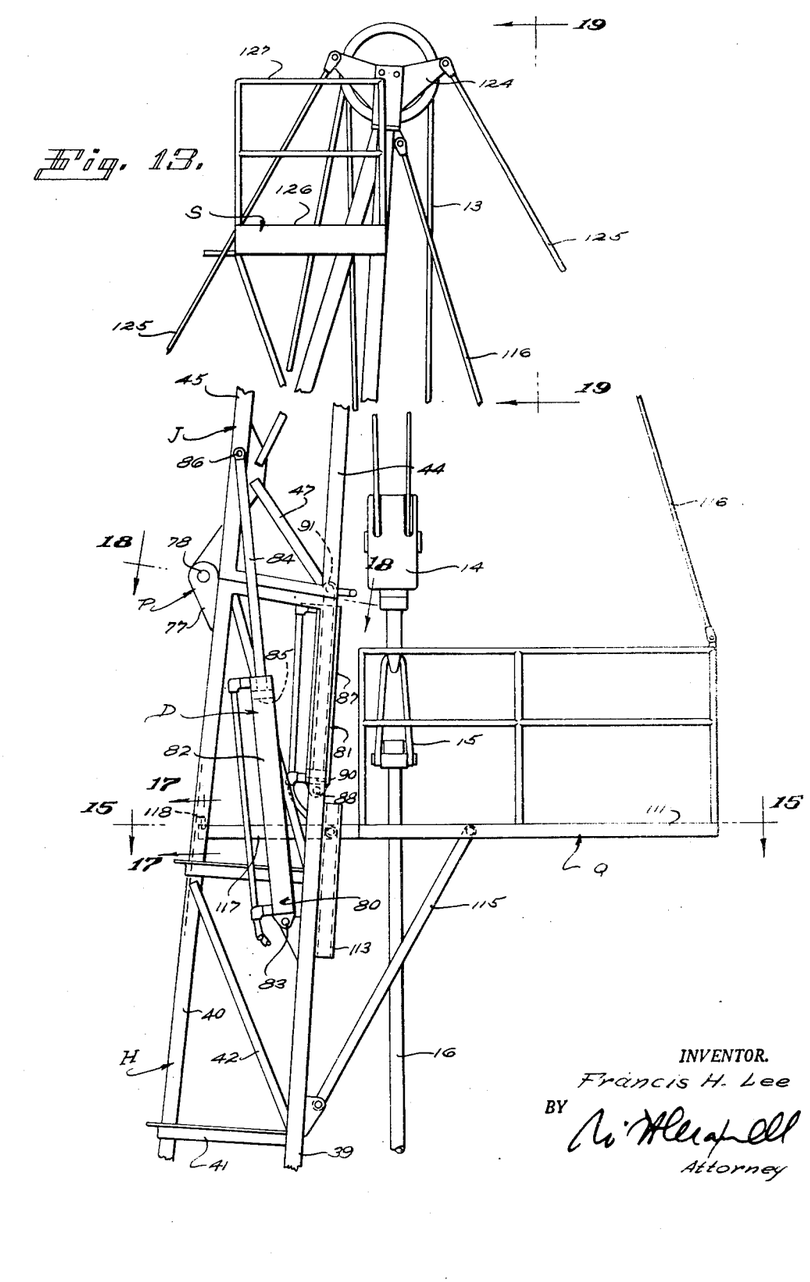
Fig. 13 is a view illustrating parts shown in Figs. 11 and 12 and showing the top section of the derrick in the up or working position relative to the main section.
Figure 15:
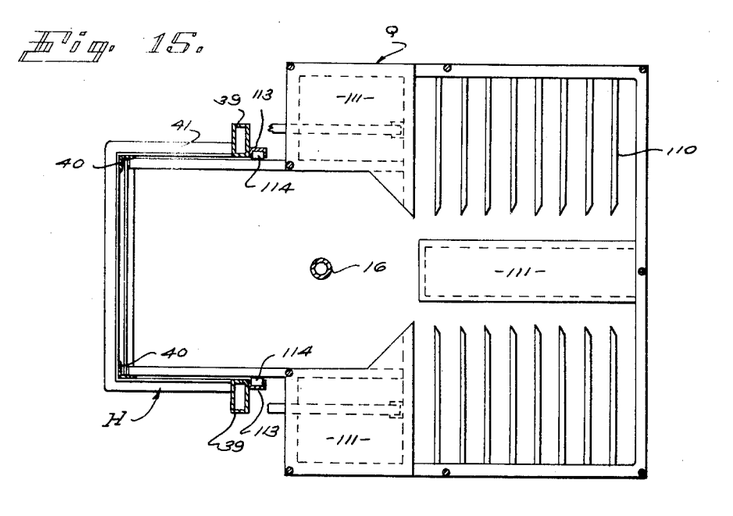
Fig. 15 is a plan section taken as indicated by line 15—15 on Fig. 13.
Figure 16:
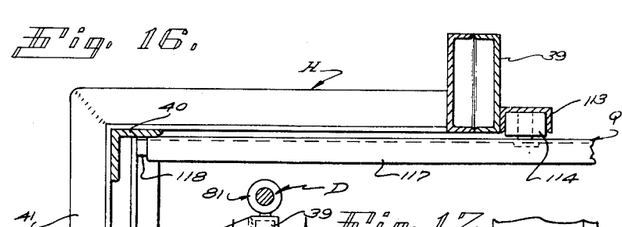
Fig. 16 is an enlarged view of a portion of the structure shown in the upper lefthand part of Fig. 15.
Figure 17:
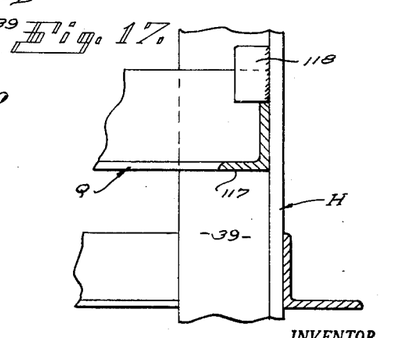
Fig. 17 is an enlarged detailed sectional view taken as indicated by line 17—17 on Fig. 13.
Figure 18:
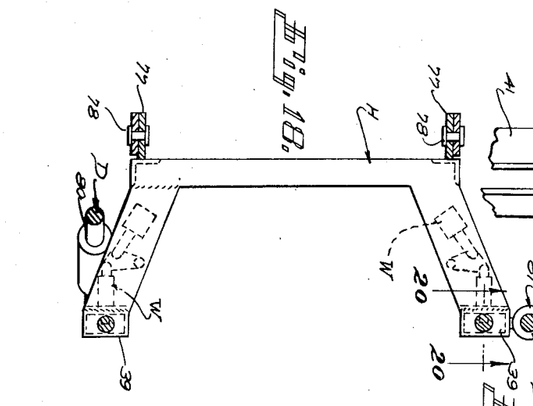
Fig. 18 is an enlarged detailed transverse sectional view taken as indicated by line 18—18 on Fig. 13.
Figure 19:
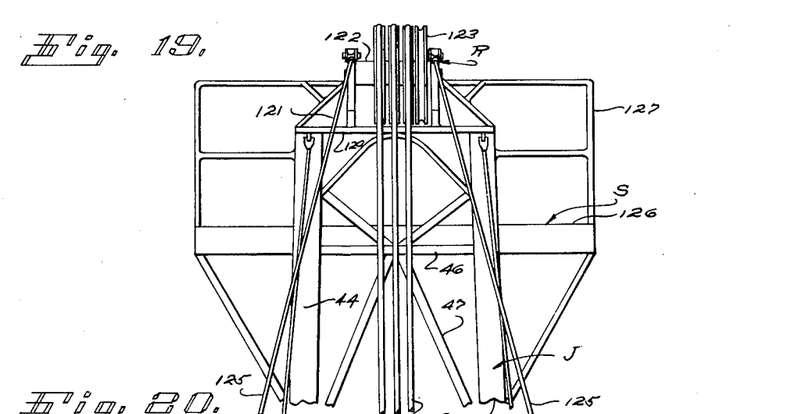
Fig. 19 is an elevation of the upper end portion of the derrick, being a view taken as indicated by line 19—19 on Fig. 13.
Figure 20:
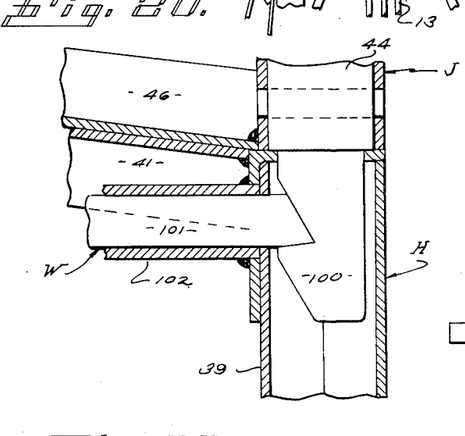
Fig. 20 is an enlarged detailed sectional view taken as indicated by line 20—20 on Fig. 18.

The operating means D provided to operate the top section J of the derrick relative to the main section H serves to swing the top section relative to the main section between a depending position such as is shown in Fig. 11 and an extended or working position such as is shown in Fig. 13, and it is preferably a fluid pressure actuated structure reversible so that it operates the top section in either direction between said positions. In the preferred form of the invention the operating means D involves two fluid pressure actuated units 80 and 81 each of the units being, in effect, a cylinder and piston mechanism. The units 80 and 81 are coupled to and between the top section J and the main section H and are so related to the pivotal connection between said derrick sections as to initially oppose each other during initial movement of the top section from the position shown in Fig. 11, at which time one of the units overcomes the other, to thereafter work together or in unison when maximum force is required to move the top section up from a position such as is shown in Fig. 12 to a position where it approaches its working position and to finally oppose each other with one unit overcoming the other as the section J approaches and then finally reaches its working position shown in Fig. 13. The desired relationship between and cooperation of the units 80 and 81 is gained by so relating and pivotally connecting the units to the derrick sections as to gain over-center relationship of the units relative to the center or axis of pivotal connection between the said derrick sections, the arrangement and relationship being such that the units 80 and 81 both start positioned at one side of the said axis between the derrick sections when the top section is down, as shown in Fig. 11, and then successively pass such center or axis to finally both occur at the opposite side of said center or axis when the top section is in operation position, as shown in Fig. 13.

In general the units 80 and 81 may be similar or of like character, for instance, each may be characterized by a cylinder, a piston, and a rod carried by or projecting from the piston. In the preferred arrangement the cylinders of the two units 80 and 81 are pivotally connected or anchored to one of the derrick sections while the rods of the units are anchored to the other derrick section. In the particular arrangement illustrated the cylinders of the two units are anchored to the main derrick section H while the rods are connected to the top section J.

To gain the desired over-center action above described the connections between the units and one of the derrick sections are spaced a substantial distance apart about the said axis on which the derrick sections are connected. In the particular case illustrated in the drawings the cylinders of the units 80 and 81 are connected to the main derrick section H at points spaced apart around the axis of pivotal connection between the derrick sections a distance of approximately 15° and the rods are also connected in spaced relationship relative to the said axis, being connected to the top section J at points which are spaced around the said axis a matter of about 80°.

It is preferred that the parts be so constructed and related that a minimum of force is applied to turn the top section H from the position shown in Fig. 11 during the initial upward movement while maximum turning force is required and desired as the top section approaches a horizontal position while it moves through a horizonal position and as it moves up and approaches a vertical position. As the top section approaches a vertical position it is again desirable that there be a minimum of force moving the top section until it finally reaches the working position shown in Fig. 13. To gain these results or this variation in the force applied the connections between the units 80 and 81 are preferably made in a manner such as is shown throughout the drawings.

In the particular application of the invention illustrated the cylinder 82 of unit 80 is connected by pivot pin 83 to the forward side portion of derrick section H at a point a substantial distance below the top of derrick section H. The rod 84 extending from the piston 85 in cylinder 82 extends to and connects with the top section J of the derrick at the rear side thereof where it is joined to the derrick by pivot pin 86.

The cylinder 87 of unit 81 is connected by a pivot pin 88 to the forward side of derrick section H at a point well above the pivot pin 83 and the rod 89 extending from piston 90 in cylinder 87 extends to the lower forward corner of derrick section H where it is connected to the derrick section by a pivot pin 91. It will be observed from the drawings that with the arrangement and relationship of parts just described the pivot pins 83 and 88 connecting the cylinders to the forward side portion of derrick section H are located substantially different distances from the pivotal axis between the derrick sections and are located a substantial distance apart around that axis while the pivot pins 86 and 91 connecting the rods to the derrick section H connect to the rear and front portions of the derrick section, respectively, to be about equal distances from the pivotal axis between the derrick sections and to be about 80° apart around that axis.

Figure 22:
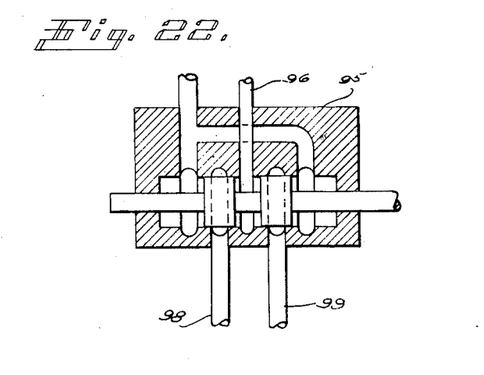
Figs. 22 and 23 are enlarged detailed sectional views illustrating valves that may be employed in the hydraulic system.

The hydraulic system provided by the present invention provides a control valve 95 connected with a pressure supply line 96 and with an exhaust line 97. Distributing lines 98 and 99 extend from the valve 95 to the units 80 and 81. The line 98 extends to the upper end of cylinder 87 and to the lower end of cylinder 82 while the line 99 extends to the lower end of cylinder 87 and to the upper end of cylinder 82. The valve 95 shown in detail in Fig. 22 is operable between a position where pressure is admitted to line 98 while fluid is exhausted from line 99 and a position where pressure is admitted to line 99 and fluid is exhausted from line 98. When the top section is down, as shown in Fig. 11, and fluid under pressure is admitted to line 98, such fluid acts in the pivoted end of cylinder 84 and in the rod end of cylinder 87, with the result that the units 80 and 81 oppose each other but greater force is developed in unit 80, with the result that unit 80 overcomes unit 81 and initiates movement of the derrick section J. As the operation continues and as derrick section 80 approaches a horizontal position unit 81 passes the position shown in Fig. 12 in the direction indicated by the arrow x in Fig. 12, so that unit 81 is over-center or opposite unit 80 relative to the pivot between the derrick sections, with the result that it acts with unit 80 to swing the derrick section H upwardly. This combined or unified action of the units 80 and 81 continues until the top section H approaches its working position shown in Fig. 13, at which time unit 80 passes over center, putting both of the units at the same side of the center or axis between the derrick sections, at which time the units 80 and 81 again oppose each other checking the pivotal movement of the section J. Under this latter condition unit 81 overcomes unit 80 to bring the derrick section J to the final working position shown in Fig. 13.

When the valve 95 is positioned to put pressure in line 99 while fluid is exhausted from line 98, the condition or operation just described is reversed, and the derrick section J is moved from the working position to the folded position, the sequence of operation being reversed as will be apparent from consideration of the drawings.

The lock means W releasably secures the top section J in the up or working position. In the form of the invention illustrated this means involves hooks 100 on one derrick section cooperating with latch bolts 101 on the other derrick section. The hooks 100 are shown fixed to and projecting from the lower ends of the main leg sections 44 of derrick section J and the bolts are slidably carried by guide means 102 at the upper end of derrick section H.

A suitable operating means is provided for each of the bolts so that the bolts can be retracted from the hooks to release the means W. In the case illustrated each operating means involves a pivoted rocker arm 103 to which a latch bolt is loosely pivotally connected at 104. A fluid pressure actuated unit or cylinder and piston mechanism 105 is loosely pivotally connected to the rocker arm. A spring 106 normally holds the mechanism just described in an active or working position with the bolt extended to cooperate with the hook. Lines 107 and 108 extending from lines 98 and 99, respectively, connect to opposite ends of the cylinders of units 105. Through the connections established by lines 107 and 108 the latch bolts are in active or in operating position as the top derrick section J is moved to the operating position and both latch bolts are released when the valve 95 is operated to move the top section from the operating position to the folded position.

The platform Q is shown as a flat frame-like structure with rack ringers 110 and suitable decks 111. Further, a rail 112 is provided at the periphery of the platform.

In accordance with the present invention the platform is slidably pivotally connected to the forward side of the main frame section H. The connection is shown as including fixed vertical tracks 113 on the derrick section H and rollers 114 carried by the platform and operating in the tracks. Links 115 connect the platform and the main frame section H and when the platform is horizontally disposed or is in working position the links form diagonal braces for it. Tie lines 116 connect to the outer or projecting portion of the platform and extend upward and inward therefrom to points where they connect to the top section J of the derrick. The lines 116 operate under tension and cooperate with the links 115 in supporting the platform in the horizontal position when the derrick is up. The platform is so mounted and related as to operate to the horizontal position under the action of gravity and it is preferred, in practice, that suitable stop means be provided to stop it in the horizontal position. In the case illustrated the platform is provided with rearwardly extending projections 117 which reach to the rear portion of derrick section H to engage under fixed stops 118 on the stabilizing leg sections 40.

The crown block R shown in the drawings is of a type commonly used and as illustrated involves, generally, a horizontally disposed plate 120 to which the legs of the derrick section J are attached. There are upstanding brackets 121 on the plate carrying a shaft 122 which supports line carrying sheaves 123. In the preferred construction lugs 124 project from the brackets 121 and serve as parts to which guy wires 125 may be attached for stabilizing the derrick when it is in the working position.

The platform S is shown located at the upper end portion of top section J of the derrick and in the case illustrated it is shown as a fixed platform having a deck 126 and it is provided with a suitable rail 127.

The releasable fastener T acts between the main derrick section H and the top section J to hold these sections in the relationship shown in Figs. 1 and 11 in the course of operation of the main section H from the down and folded position to the up or operating position. The particular means illustrated in the drawings involves a hook 130 pivotally connected to one of the sections and engaged with a suitable part of the other section and a suitable operating line 131 is shown connected with the hook.

The hydraulic system provided by the present invention is shown as including a reservoir 140 to carry a supply of operating fluid. A pump 141 draws fluid from the reservoir 140 and delivers it to the supply line 96. A second pump 142 receives fluid from the reservoir 140 and delivers it to the valve 69 which controls the operating means M for the prop 10. Suitable pressure relief valves 143 and 144 may be provided at the discharge sides of the pumps with by-pass connections 145 for returning fluid to the reservoir when pressure in the system is too great. The supply line 96 not only connects to the valve 95 controlling the means D, as above described, but it extends to and supplies the valve 63 which controls the operating means L. It will be observed that exhaust connections 97 extend from the several valves 95, 63 and 69 to the reservoir so that when fluid is exhausted from the operating units it returns to the reservoir to be recirculated by the pumps.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A structure of the character described including, a base, a derrick having two elongate sections pivotally connected together in end to end relation, one section being rigid with the base and projecting upwardly therefrom and having the other section pivoted to its upper end portion, means adapted to swing the said other section relative to the stationary section into and out of a working position where it projects upwardly from the first mentioned section, an elongate prop engageable between the sections with one end engaging one section and the other end engaging the other section to act under compression and hold said other section in an upright position, the prop having one end pivoted to one section, and a link pivoted to the other end of the prop and to the other section.

2. A structure of the character described including, a base, a derrick having two elongate sections pivotally connected together in end to end relation, one section being rigid with the base and projecting upwardly therefrom, means adapted to swing the other section relative to the stationary section into and out of operating position where it projects upwardly from the first mentioned section, an elongate prop having one end pivoted to one section, the prop being adapted to swing to operating position between the sections where its other end engages said other section and holds it in an up position, a link pivoted to said other end of the prop and to said other section, and fluid pressure actuated means operating the prop to said position.

3. A structure of the character described including, a base, a derrick substantially rectangular in plan configuration and having two sections pivotally connected together, one section being rigid with the base, and projecting upwardly therefrom, means operating to swing the other section relative to the stationary section, an elongate prop having one end pivoted to one section, the prop being adapted to swing to operating position between the sections where its other end holds said other section in an up position, and means wholly within the confines of the derrick operating the prop to said position.

4. A structure of the character described including, a base, a derrick having two sections pivotally connected together, one section being rigid with the base and projecting upwardly therefrom, means operating to swing the other section relative to the stationary section, an elongate prop having one end pivoted to one section to swing to operating position between the sections holding said other section in an up position, a link pivotally connecting the other end of the prop and the pivoted end portion of said other section, and means operating the prop to said position.

5. A structure of the character described including, a base, two elongate derrick sections one rigid with the base and including a pair of load bearing legs and a pair of stabilizing legs terminating below the upper ends of the load bearing legs, the other derrick section having load bearing legs and stabilizing legs, means pivotally connecting the load bearing legs of the sections together, an elongate prop having one end pivotally carried by the stabilizing legs of the stationary section and having its other end engageable under the stabilizing legs of the other section when the sections are in substantial alignment, and an elongate link having one end pivotally connected to the prop and the other end pivotally connected to said other section of the derrick.

6. A structure of the character described including, a base, two derrick sections one stationary on and rigid with the base and including a pair of load bearing legs and a pair of stabilizing legs terminating below the upper ends of the load bearing legs, the other derrick section having load bearing legs and stabilizing legs, means pivotally connecting the load bearing legs of the sections together, an elongate prop adapted to be arranged between the stabilizing legs of the sections with its ends engaging the sections when said other section is in working position, and fluid pressure actuated means adapted to operate the prop into and out of working position.

References Cited in the file of this patent

UNITED STATES PATENTS

| Number | Name | Date |
|---|---|---|
| 2,151,057 | Suth | Mar. 21, 1939 |
| 2,176,731 | Claire | Oct. 17, 1939 |
| 2,271,577 | Woolslayer et al. | Feb. 3, 1942 |
| 2,291,055 | Ortloff | July 28, 1942 |
| 2,335,584 | Couse | Nov. 30, 1943 |
| 2,336,432 | Wilson | Dec. 7, 1943 |
| 2,364,851 | Johansen | Dec. 12, 1944 |
| 2,413,149 | McCarthy et al. | Dec. 24, 1946 |
| 2,495,563 | Wooslayer et al. | Jan. 24, 1950 |
| 2,517,813 | Wallace | Aug. 8, 1950 |
| 2,593,246 | Bender | Apr. 15, 1952 |